Patented Sept. 4, 1951

2,566,792

UNITED STATES PATENT OFFICE 2,566,792

STABILIZATION OF UNSATURATED KETONES

Hans Dannenberg, Berkeley, Calif., assignor to Shell Development Company, San Francisco, Calif., a corporation of Delaware No Drawing. Application May 25, 1948, Serial No. 29,187

13 Claims. (Cl. 260—593)

This invention relates to the stabilization of unsaturated ketones and to the stable compositions of matter produced thereby. It relates more particularly to the stabilization of normally liquid unsaturated ketones having an unsaturated group of at least three carbon atoms attached to the carbonyl group, this group comprising an unsaturated tertiary carbon atom. A particular aspect of the invention relates to the rendering of these unsaturated ketones color stable under conditions normally encountered during their transportation and/or storage.

Unsaturated ketones find application in many industrial processes. In their utilization it is generally necessary that they meet exacting specifications, one of which is that they be substantially free of coloring matter. These unsaturated ketones, however, are generally prone to undergo deterioration, resulting in the formation therein of color imparting contaminants. The presence of the color imparting impurities generally renders the unsaturated ketones unsuitable for many of the purposes for which they are intended. Without in any way intending to limit the scope of the present invention by any theories advanced herein to set forth more clearly the nature of the invention, it is believed that the color imparting impurities may well be due to the formation of oxidation products of the unsaturated ketones comprising diketones. It has been found that deterioration and formation of the color imparting impurities is favored by the conditions generally encountered in the storage and transportation of the materials involving their prolonged contact with metal-containing, and particularly ferruginous, materials. A water-white unsaturated ketone, such as, for example, mesityl oxide, is often found to become discolored under normal conditions encountered in storage and/or transportation at such a rapid rate that its color is generally of medium yellow to amber after a period of only about fourteen days.

As a result of such contamination of the unsaturated ketones it has generally been necessary to subject the material to a purification operation to render it suitable for many of its more important uses. Such purification often entails costly operations due to the difficulty encountered in attempting the separation of the color-imparting contaminants by generally available means.

The various inhibitors which have heretofore been proposed to suppress the deterioration of unsaturated ketones, while in some instances fairly effective, are in general unsuited either because of the very short period of their effectiveness, their relative ineffectiveness under conditions generally encountered in storage and shipment, especially when in contact with metal-containing surfaces, or because of the difficulties encountered in separating the inhibitor, when necessary, after it has served its purpose.

As disclosed in co-pending application Serial No. 582,589, filed March 13, 1945, of which the present application is a continuation-in-part, and which issued as Patent No. 2,444,006 on June 22, 1948, it has now been found that the deterioration of unsaturated ketones particularly with respect to discoloration may be suppressed to at least a substantial degree under conditions generally encountered in shipment and storage, even in the presence of metal-containing surfaces by incorporating therein a relatively small amount of a secondary amine.

The present invention is adapted to the stabilization, particularly with respect to color, of all unsaturated ketones having an unsaturated group of at least three carbon atoms, said unsaturated group having an unsaturated tertiary carbon atom. Examples of this particular group of unsaturated ketones comprise: methyl isopropenyl ketone, ethyl isopropenyl ketone, methyl isobutenyl ketone, propyl isopropenyl ketone, cyclopentyl isopropenyl ketone, allyl isopropenyl ketone, di-isopropenyl ketone, 2-ethyl-butene-1-one-3, 2-propyl-butene-1-one-3, 2-ethyl-pentene-1-one-3, 2-methyl-pentene-1-one-4, 2-methyl-hexene-2-one-4, 3-methyl-pentene-2-one-4, 2-methyl-pentene-2-one-4, 3-ethyl-pentene-2-one-4, 2-ethyl-pentene-2-one-4, isophorone, and the like as well as their homologues, analogues and suitable substitution products thereof. The invention is, however, particularly applicable to the stabilization, especially with respect to color, of alpha-beta unsaturated ketones having an unsaturated tertiary carbon atom in the beta position. The following are representative unsaturated ketones of this preferred group to which the invention is particularly applicable: mesityl oxide, 2 - methyl - hexene - 2 - one - 4, 2 - methyl - heptene - 2 - one - 4, 2,5 - dimethyl - hexene - 2 - one - 4, 2 - ethyl - pentene - 2 - one - 4, 3 - methyl - hexene - 3 - one - 5, 3 - ethyl - hexene - 3 - one - 5, 2,2 - dimethyl - hexene - 3 - one - 5, 2,5 - dimethyl - hexadiene - 2,5-one-4 and the like, as well as their homologues, analogues and suitable substitution products thereof.

Although the inhibitors of the invention are applied with particular advantage to the stabilization of the above-defined groups of unsaturated ketones, the invention comprises in its broadest scope the stabilization of any normally liquid unsaturated ketone. Examples of such other unsaturated ketones comprised within the scope of the invention are: pentene-1-one-4, hexene-1-one-4, hexene-1-one-5, pentene-2-one-4, 5-methyl - hexene-1-one-4, 5-methyl - hexene-2-one-4, 2-methyl-hexene-3-one-5, hexadiene-1,5- one-4, and the like as well as their homologues, analogues and suitable substitution products.

The stabilizing materials incorporated in the unsaturated ketones to be stabilized in accordance with the invention comprise, in their broadest scope the dihetero-azines in which a hydrogen atom is attached to a nuclear nitrogen atom in the diheteroatomic azine ring. The heterocyclic compounds known collectively as the dihetero-azines consist of the heterocyclic compounds having a six-membered diheteroatomic ring in which one of the heteroatoms is nitrogen and the second heteroatom is nitrogen, oxygen or sulfur. The dihetero-azines consist of the diazines, oxazines and thiazines. The two heteroatoms may be positioned in the ortho, meta or para positions of the dihetero-azine ring.

The suitable dihetero-azines employed in the present invention are those in which a nuclear nitrogen atom of the dihetero-azine ring is connected to a hydrogen atom. The dihetero-azine compounds comprised within the scope of the invention include those in which one or more carbon atoms of the dihetero-azine ring, as well as the heteroatom other than the nitrogen atom contained in the nuclear amino group, are directly connected to substituent groups such as, for example, alkyl, aryl, alkyl-aryl, aryl-alkyl, or other substituent groups. When the structure of the diheteroazine is of non-aromatic character, this is generally expressed by reference thereto as a hydroazine. Similarly the diazines, oxazines and thiazines of non-aromatic structure are designated as hydrodiazines, hydrooxazines and hydrothiazines, respectively.

Illustrative of the dihetero-azines having a hydrogen atom attached to a nitrogen atom in the dihetero-azine ring which as a class have been found peculiarly effective in their ability to stabilize the normally liquid unsaturated ketones are the following: the hydro-1,2-diazines (hydro-pyridazines) such as, 3-phenyl-hexahydro-1,2-diazine, 3-methyl-6-isopropyl-1,4,5,6-tetrahydro-1,2-diazine, 1-phenyl-3-methyl-6-isopropyl-1,4,5,6-tetrahydro-1,2-diazine, 3,6-dimethyl-hexahydro-1,2-diazine; the hydro-1,3-diazines (hydro-pyrimidines) such as hexahydro-1,3-diazine, 2,4,4,6-tetramethylhexahydro-1,3-diazine, 2-phenyl-4,6-dimethylhydro-1,3-diazine, 2,4,6-trimethyl-1,4,5,6-tetrahydro-1,3-diazine, 2,4-dimethyl-6-amine-hydro-1,3-diazine; the hydro-1,4-diazines (hydropyrazines), such as hexahydro-1,4-diazine (piperazine), 2-phenyl-hexahydro-1,4-diazine, 1,4-dihydro-1,4-diazine, 2,5-dimethyl-tetrahydro-1,4-diazine; the hydro-1,2-oxazines such as, 2,3,5,6-tetrahydro-1,2-oxazine (oxazidine); the hydro-1,3-oxazines such as, 2-phenyl-4,4,6-trimethyl-tetrahydro-1,3-oxazine, 4,4,6-trimethyl-tetrahydro-1,3-oxazine, 6-methyl-4-isobutyl-tetrahydro-1,3-oxazine, 2-phenyl-5,6-dihydro-1,3-oxazine, 2-phenyl-4,4,6-trimethyl-5,6-dihydro-1,3-oxazine; the hydro-1,4-oxazines such as, tetrahydro-1,4-oxazine (morpholine), 2-phenyl-4,4,6-trimethyl-5,6-dihydro-1,4-oxazine; the hydrothiazines such as, 2,6-dimethyl-tetrahydro-1,4-thiazine (2,6-dimethyl-thiamorpholine), tetrahydro-1,4-thiazine (thiamorpholine), 1,4-thiazine, 2-phenyl-4,4,6-trimethyl-3,5,6-trihydro-1,3-thiazine, benzodihydrothiothiazine, their homologues, analogues and suitable substitution products.

In contrast to this behavior of the above secondary amines, the primary and tertiary amines are generally not only ineffective as stabilizers but their incorporation into the unsaturated ketones often results in an acceleration of discoloration. Of the above secondary amines the saturated dihetero-azines have been found to be outstanding in their ability to stabilize the unsaturated ketones, particularly with respect to color. Of the suitable saturated dihetero-azines, the alkyl substituted saturated dihetero-azines are preferred. Particularly effective are tetrahydro-1,4-oxazine and its alkyl substitution products especially its polymethyl substitution products as exemplified by 2,4,4,6-tetramethyltetrahydrooxazine.

A particular advantage of the secondary amines as stabilizers for the unsaturated ketones in accordance with the invention resides in their effectiveness in the presence of metal-containing surfaces. Thus, it has been found that substantial improvement with respect to color stability of the unsaturated ketones over prolonged periods of time, even in the presence of ferruginous materials, is obtained by the incorporation therein of the above heterocyclic secondary amines. Thus, whereas a substantially colorless unsaturated ketone, such as, for example, mesityl oxide, will turn yellow to amber in as short a period as fourteen days, the incorporation therein of a secondary amine of the above-defined class of diheterocyclic secondary amines, such as, for example, tetrahydro-1,4-oxazine (morpholine) will render it substantially color stable in the presence of iron over periods exceeding about one hundred days.

The quantity of the heterocyclic secondary amine added to the unsaturated ketone to be stabilized, may vary within the scope of the invention. The amount required to attain the desired degree of color stability will vary not only in accordance with the particular unsaturated ketone stabilized but with the particular secondary amine employed. In general, it has been found that the addition of the heterocyclic secondary amine to the unsaturated ketone in an amount ranging from about 0.01% to about 3%, and preferably from 0.1% to about 1% by weight has been found satisfactory. Higher or lower concentrations of the secondary amine may however be resorted to within the scope of the invention. The secondary amine may be added to the unsaturated ketone as such or it may be added to only a portion of the unsaturated ketone and the resulting mixture or solution then added to the remaining ketone in an amount sufficient to attain the desired concentration of the stabilizer therein.

The unsaturated ketone may be recovered from the color stable composition of matter, comprising the unsaturated ketone and inhibiting amount of secondary amine, by any suitable means. Thus the secondary amine may generally be readily removed by one or more of such steps comprising, for example, distillation, fractionation, adsorption, solvent extraction, etc.

The following examples are illustrative of the invention:

EXAMPLE I

Eight samples, each consisting of 100 cc. of mesityl oxide in a glass stoppered, 125 cc. bottle were prepared. To each of seven of the samples there was added an amine in an amount equal to one millimole of the respective amine. To all the samples containing the added amine, and to the sample containing no added amine, there was added a rusty three-inch nail as a source of iron. To further simulate normal storage and transportation conditions all of the samples were stored in the dark at room temperature for fourteen days. At intervals the samples were carefully examined and their color determined. Color of the sample was obtained and recorded by comparison with standard liquids consisting of aqueous solutions of potassium bichromate which were contained in similar bottles. The following color scale, based upon the color of the aqueous solutions of potassium bichromate was used:

Color scale

1. Very faint yellow, corresponding to 0.5 mg. $K_2Cr_2O_7$ per 100 cc.
2. Faint yellow, corresponding to 1 mg. $K_2Cr_2O_7$ per 100 cc.
3. Very slight yellow, corresponding to 1.5 mg. $K_2Cr_2O_7$ per 100 cc.
4. Slight yellow, corresponding to 2.5 mg. $K_2Cr_2O_7$ per 100 cc.
5. Medium yellow, corresponding to 5 mg. $K_2Cr_2O_7$ per 100 cc.
6. Dark yellow [1]
7. Light amber [1]
8. Dark amber [1]

[1] These colors were not determined quantitatively.

The particular amine added to each sample, and the color determination obtained at each examination during the storage period, are indicated in the following table A:

Table A

| Storage in days | | | 1 | 3 | 7 | 10 | 14 |
|---|---|---|---|---|---|---|---|
| Sample No. | Stabilizer added | Iron Present | Color readings | | | | |
| 1 | Hexahydro-1,4-diazine | Yes | 1 | 1+ | 2+ | 2.5 | 2.5 |
| 2 | 2,6-Dimethyltetra-hydro-1,4-thiazine | Yes | 1 | 1 | 2- | 2.5 | 3.5 |
| 3 | 2-Phenyl-4,4,6-trimethyltetrahydro-oxazine | Yes | 1 | 1 | 2 | 2.5 | 3+ |
| 4 | 2,4,4,6-Tetramethyltetrahydrooxazine | Yes | 1 | 1 | 1.5 | 2 | 2+ |
| 5 | 2,4,4,6-Tetramethylhexahydro-1,3-diazine | Yes | 1 | 1.5 | 2.5 | 3 | 3+ |
| 6 | Diisopropylamine | Yes | 1 | 1 | 2 | 2.5 | 3+ |
| 7 | Tetrahydro-1,4-oxazine (morpholine) | Yes | 1 | 1 | 2 | 2 | 2.5 |
| 8 | None | Yes | 1 | 1.5 | 3 | 3.5 | 4.5 |

EXAMPLE II

Four samples, each consisting of 100 cc. of mesityl oxide in a glass stoppered, 125 cc. bottle were prepared. To each of the samples there was added an amine in an amount equal to one millimole of the respective amine. To all three samples there was added a rusty three inch nail as a source of iron. To further simulate normal storage and transportation conditions all of the samples were stored in the dark at room temperature for 32 days. At frequent intervals the samples were carefully examined and their color determined. The color scale given in Example I was used. The particular amine added to each sample, and the color determination obtained at each examination during the storage period, are indicated in the following Table B:

Table B

| Storage in days | | 1 | 3 | 7 | 10 | 14 | 17 | 21 | 25 | 32 |
|---|---|---|---|---|---|---|---|---|---|---|
| Sample No. | Stabilizer added | Color reading | | | | | | | | |
| 1 | Tetrahydro-1,5-oxazine (morpholine) | 1 | 1 | 2 | 2 | 2.5 | 3 | 3 | 3.5 | 3.5 |
| 2 | 2,4,4,6-Tetramethyltetrahydrooxazine | 1 | 1 | 1.5 | 2 | 2+ | 2.5 | 2.5 | 3- | 3- |
| 3 | Diisopropylamine | 1 | 1 | 2 | 2.5 | 3+ | 3.5 | 4- | 4 | 4 |
| 4 | None | 1 | 1.5 | 3 | 3.5 | 4.5 | 4.5 | 5 | 5+ | 5+ |

EXAMPLE III

Four samples, each consisting of 100 cc. of mesityl oxide in a glass stoppered, 125 cc. bottle were prepared. The mesityl oxide employed was obtained from a different source than that used in Examples I and II. To each of two of the samples there was added an amine in an amount equal to one millimole of the respective amine. To the two samples containing the added amine, and to one of the samples containing no added amine, there was added a rusty three-inch nail as a source of iron. To further simulate normal storage and transportation conditions, all of the samples were stored in the dark at room temperature for 92 days. At frequent intervals the samples were carefully examined and their color determined. The color scale given in Example I was used. The particular amine added to each sample, and the color determination obtained at each examination during the storage period, are indicated in the following Table C:

Table C

| Storage in days | | | 1 | 3 | 6 | 9 | 12 | 16 | 31 | 61 | 92 |
|---|---|---|---|---|---|---|---|---|---|---|---|
| Sample No. | Stabilizer added | Fe Present | Color reading | | | | | | | | |
| 1 | Tetrahydro-1,4-oxazine (morpholine) | Yes | 1 | 1 | 1.25 | 1.25 | 1.5 | 1.75 | 2 | 2.75 | 2.75 |
| 2 | Mono-ethanolamine | Yes | 1 | 5 | 5 | 5 | 6 | 6 | 6 | 6 | 7 |
| 3 | None | Yes | 1.5 | 2 | 3.5 | 4.25 | 4.5 | 5 | 6 | 7.5 | 8 |
| 4 | None | No | 1.5 | 2.5 | 4 | 5 | 5 | 6 | 6 | 6 | 6 |

I claim as my invention:

1. An unsaturated ketone stabilized against color change under normal conditions encountered in storage and transportation consisting essentially of a normally liquid olefinically unsaturated ketone containing a diheteroazine containing a six-membered dihetero-atomic ring in which both heteroatoms are nitrogen and a hydrogen atom is attached to a nuclear nitrogen atom of the diheteroatomic ring in an amount sufficient to inhibit discoloration of said unsaturated ketone.

2. An unsaturated ketone stabilized against color change under normal conditions encountered in storage and transportation consisting essentially of a normally liquid olefinically unsaturated ketone containing from about 0.01% to about 3% by weight of a dihetero-azine containing a six-membered dihetero-atomic ring in which both heteroatoms are nitrogen and in which a hydrogen atom is attached to a nuclear nitrogen atom of the diheteroatomic ring.

3. An unsaturated ketone stabilized against color change under normal conditions encountered in storage and transportation consisting essentially of a normally liquid unsaturated ketone having an unsaturated group of at least three carbon atoms attached to the carbonyl group, said unsaturated group having an unsaturated tertiary carbon atom, containing from about 0.01% to about 3% by weight of a dihetero-azine containing a six-membered dihetero-atomic ring in which both heteroatoms are nitrogen and in which a hydrogen atom is attached to a nuclear nitrogen atom of the diheteroatomic ring.

4. An unsaturated ketone stabilized against color change under normal conditions encountered in storage and transportation consisting essentially of a normally liquid alpha-beta unsaturated ketone having an unsaturated tertiary carbon atom in the beta position containing from about 0.01% to about 3% by weight of a dihetero-azine containing a six-membered dihetero-atomic ring in which both heteroatoms are nitrogen and in which a hydrogen atom is attached to a nuclear nitrogen atom of the diheteroatomic ring.

5. Mesityl oxide stabilized against color change under normal conditions encountered in storage and transportation consisting of mesityl oxide containing from about 0.01% to about 3% by weight of a dihetero-azine containing a six-membered dihetero-atomic ring in which both heteroatoms are nitrogen and in which a hydrogen atom is attached to a nuclear nitrogen atom of the diheteroatomic ring.

6. An unsaturated ketone stabilized against color change under normal conditions encountered in storage and transportation consisting essentially of a normally liquid alpha-beta unsaturated ketone having an unsaturated tertiary carbon atom in the beta position containing from about 0.01% to about 3% by weight of a hydrodiazine in which a hydrogen atom is attached to a nitrogen atom in the hydrodiazine ring.

7. Mesityl oxide stabilized against color change under normal conditions encountered in storage and transportation consisting of mesityl oxide containing from about 0.01% to about 3% by weight of hexahydro-1,4-diazine.

8. Mesityl oxide stabilized against color change under normal conditions encountered in storage and transportation consisting of mesityl oxide containing from about 0.01% to about 3% by weight of 2,4,4,6-tetramethylhexahydrodiazine.

9. An unsaturated ketone stabilized against color change under normal conditions encountered in storage and transportation consisting of an alpha,beta-unsaturated ketone having an unsaturated tertiary carbon atom in the beta position containing from about 0.01 to about 3% by weight of hexahydro-1,4-diazine.

10. An unsaturated ketone stabilized against color change under normal conditions encountered in storage and transportation consisting of an alpha,beta-unsaturated ketone having an unsaturated tertiary carbon atom in the beta position containing from about 0.01% to about 3% by weight of 2,4,4,6-tetramethylhexahydro-1,3-diazine.

11. The method of inhibiting the discoloration of mesityl oxide under normal conditions encountered in storage and transportation which consists of adding to said mesityl oxide from about 0.01% to about 3% by weight of a dihetero-azine containing a six-membered diheteroatomic ring in which both heteroatoms are nitrogen and in which a hydrogen atom is attached to a nuclear nitrogen atom in the diheteroatomic ring.

12. The method of inhibiting the discoloration of an unsaturated ketone consisting essentially of a normally liquid alpha,beta-unsaturated ketone having an unsaturated tertiary carbon atom in the beta position under normal conditions encountered in storage and transportation which consists of adding to said ketone from about 0.01% to about 3% by weight of a dihetero-azine containing a six-membered diheteroatomic ring in which both heteroatoms are nitrogen and in which a hydrogen atom is attached to a nuclear nitrogen atom in the diheteroatomic ring.

13. The method of inhibiting the discoloration of a normally liquid olefinically unsaturated ketone under normal conditions encountered in storage and transportation which consists of adding to said ketone a dihetero-azine containing a six-membered diheteroatomic ring in which both heteroatoms are nitrogen and in which a hydrogen atom is attached to a nuclear nitrogen atom in the diheteroatomic ring in an amount sufficient to inhibit discoloration of said unsaturated ketone.

HANS DANNENBERG.

REFERENCES CITED

The following references are of record in the file of this patent:

UNITED STATES PATENTS

| Number | Name | Date |
|---|---|---|
| 1,766,760 | Morton | June 24, 1930 |
| 2,001,584 | Reed | May 14, 1935 |
| 2,071,064 | Downing et al. | Feb. 16, 1937 |
| 2,087,597 | Gutzeit | July 20, 1937 |
| 2,121,010 | Britton et al. | June 21, 1938 |
| 2,232,785 | Howk | Feb. 25, 1941 |
| 2,294,286 | Dannenberg et al. | Aug. 25, 1942 |
| 2,458,780 | Howland | Jan. 11, 1949 |
| 2,476,554 | Lincoln et al. | July 19, 1949 |